US006805266B2

(12) United States Patent
Doron et al.

(10) Patent No.: US 6,805,266 B2
(45) Date of Patent: Oct. 19, 2004

(54) SAFETY DEVICE FOR A LIQUID-CONTAINING VESSEL

(76) Inventors: Av Doron, Timrat (IL); Shlomo Shaine, Migdal Haemek (IL)

( * ) Notice: Subject to any disclaimer, the term of this patent is extended or adjusted under 35 U.S.C. 154(b) by 160 days.

(21) Appl. No.: 10/162,725

(22) Filed: Jun. 4, 2002

(65) Prior Publication Data

US 2002/0179637 A1 Dec. 5, 2002

(51) Int. Cl.[7] .............................................. A47G 19/14
(52) U.S. Cl. ......................... 222/475; 222/470; 222/472
(58) Field of Search ........................... 222/475.1, 465.1, 222/470, 472, 474, 473, 510, 511–512, 505, 518, 542, 514, 454

(56) References Cited

U.S. PATENT DOCUMENTS

| | | | | |
|---|---|---|---|---|
| 2,040,087 A | * | 5/1936 | Hackl ........................... | 222/469 |
| 3,059,817 A | * | 10/1962 | Tregoning .................... | 222/245 |
| 3,701,063 A | * | 10/1972 | Clausse ........................ | 335/146 |
| 3,847,311 A | * | 11/1974 | Flores et al. ................. | 222/473 |
| 3,954,203 A | * | 5/1976 | Jorgenson et al. ........... | 220/825 |
| 5,265,767 A | * | 11/1993 | Gustafson .................... | 222/144.5 |
| 6,216,754 B1 | * | 4/2001 | Geroult et al. ............... | 141/350 |

FOREIGN PATENT DOCUMENTS

| | | | | |
|---|---|---|---|---|
| FR | 0549953 A1 | * | 7/1993 | ............ A47J/27/21 |
| GB | 2189378 A | * | 10/1987 | ............ A47J/27/21 |
| GB | 2190826 A | * | 12/1987 | ............ A47J/27/21 |
| GB | 2305353 A | * | 4/1997 | ............ A47J/27/21 |

* cited by examiner

Primary Examiner—David A. Schelbel
Assistant Examiner—Frederick C Nicolas
(74) Attorney, Agent, or Firm—Ostrolenk, Faber, Gerb & Soffen, LLP (57) ABSTRACT

A safety device for a liquid-containing vessel for preventing accidental spilling of the liquid contained in the vessel, the liquid having a rest level. The safety device comprises a lid assembly having a lower partition, the partition dividing the vessel into a first lower liquid containing portion and a second upper portion empty from liquid and having a second liquid opening, the lower partition comprising a movable flap and a first liquid opening that is located lower than and below the second liquid opening in an upright position of the vessel, the flap having positive magnetic attraction with the first liquid opening and being configured to seal the first liquid opening against passage of the liquid. In an upright position of the vessel, the entire safety device is located higher than and above the rest level of the liquid and the flap is normally open with respect to the first liquid opening. In a tilted position of the vessel, where the level of the liquid forms an acute angle with the first liquid opening that is larger than a given minimal operating angle, the flap closes and seals the first liquid opening at least under the hydrostatic force of the liquid and remains in a closed position at least by the positive magnetic attraction with the first liquid opening.

22 Claims, 8 Drawing Sheets

FIG. 12 his patent application claims priority to Israeli Application No. 143548, filed Jun. 4, 2001 in the name of Av

SAFETY DEVICE FOR A LIQUID-CONTAINING VESSEL

CROSS REFERENCE TO RELATED APPLICATION

This patent application claims priority to Israeli Application No. 143548, filed Jun. 4, 2001 in the name of Av DORON and Shlomo SHAINE and entitled SAFETY DEVICE FOR A LIQUID-CONTAINING VESSEL.

FIELD OF THE INVENTION

The present invention relates to a safety device for a liquid containing vessel for preventing accidental spilling of the liquid from the vessel.

BACKGROUND OF THE INVENTION

Liquid vessels having safety devices for preventing accidental spilling of the liquid from the vessel are know in the art.

Such a safety device is disclosed in British Patent No. GB 2189378 to Birkert. As shown in '378, a kettle (1), filled with a liquid, has a spout (3) through which the liquid may be poured. The kettle has a pivotally mounted flap (5) which is normally closed when the kettle is in its normal upright position. The flap (5) opens only when the kettle is tilted in the pouring direction and remains closed if the kettle is tilted in other directions. The kettle is arranged to resist being tilted in the pouring direction to a greater extent than if being tilted in other directions. Thus, if the kettle is accidentally turned over, the flap remains closed thereby preventing uncontrolled outflow of the liquid.

A drawback of the kettle of '378 is that the normally closed flap does not allow escape of vapor during heating. Furthermore, if the kettle is accidentally turned over in the pouring direction, the boiling liquid will be spilled out of the kettle and may cause serious injuries to adjacent people.

Another safety device is disclosed in British Patent No. GB 2305353 to Mustard. As shown in '353, a safety kettle includes a flap (1) which prevents the escape of water by covering the spout. The spout is normally closed during operation of the kettle and has a raised ridge which prevents the flap (1) from opening outwards. In order to open the flap for normally pouring water out of the kettle, a safety button (5) must first be pressed thereby enabling a trigger (3) to be pressed for opening the flap. The safety button (5) and the trigger (3) have to remain pressed while pouring, since, upon release of these buttons, the flap will be shut.

The kettle of '353 has one or more steam valves located on top of the kettle. In a normal upright position of the kettle these valves allow the steam to escape. However, when the kettle is tilted or upturned, these valves close and prevent the escape of water.

A drawback of the kettle of '353 is the necessity to press and hold both the safety button (5) and the trigger (3) in order to allow filling of water into the kettle. Also, if water accumulates within the safety valves, scale may create, thus decreasing the sealing effectivity of those valves.

A further type of safety device is disclosed in British Patent No. GB 2190826 to Flynn. As shown in '826, a kettle (28) having a spring loaded flap (44) occupies the spout portion of the kettle. When the flap (44) is in its normal position, that is, when the kettle is in an upright position, the flap covers the whole of the spout portion and prevents the exit of steam via the spout A button (46) is located on the handle of the kettle, as shown in FIG. 2 of '826, that when pressed, causes a shaft (48) to contact a lug (50) which is integral with the flap (44), thereby opening the flap to allow pouring of the contents of the kettle.

In '826, the steam is allowed to escape through a lid device (10). The lid device has a ball (40) that, in an upright position of the kettle, actuates against a spring (22) thus allowing the steam exit passages (38) to remain open. When the kettle is tilted or upturned, the ball (40) will roll aside and allow the spring (22) to expand until the top plate (36) contacts the gasket (34) hence preventing the passage of sum or water through the steam exit passages.

In another embodiment, shown in FIG. 4 of '826, a kettle incorporating a spring loaded flap, similar to the one described above, has a magnet (64) at one end of the flap. A second magnet (66), of the same polarity as the fast magnet (64), is mounted on a shaft (68). When the kettle is placed on a work surface, the shaft (68), by means of the second magnet (66), compresses a spring (70) and the two magnets are adjacent The like polarity of the magnets causes a repulsive force therebetween that slightly opens the flap and allows steam to escape. When the kettle is removed from the work surface, the action of the spring (70) causes the magnet (66) to move vertically downwards, thereby eliminating the repulsive force between the two magnets and causing the flap to close.

A drawback of the latter embodiment is the dependency upon a shaft that protrudes downwardly from the kettle. Such a protrusion may encounter obstacles causing the flap to remain open even when the kettle is accidentally overturned.

It is the object of the present invention to provide a safety device for a liquid-containing vessel that significantly reduces or overcomes the aforementioned disadvantages.

SUMMARY OF THE INVENTION

According to the present invention there is provided a safety device for a liquid-containing vessel for preventing accidental spilling of a liquid contained in the vessel, the liquid having a rest level;

the safety device comprising a lid assembly having a lower partition, the partition dividing the vessel into a first lower liquid containing portion and a second upper portion empty from liquid and having a second liquid opening, the partition comprising a movable flap and a first liquid opening that is located lower below than the second liquid opening in an upright position of the vessel, the flap having positive magnetic attraction with the first liquid opening and the flap being configured to seal the first liquid opening against passage of the liquid;

in an upright position of the vessel, the entire safety device is located higher above than the rest level of the liquid and the flap is normally open with respect to the first liquid opening;

in a tilted position of the vessel, where the first liquid opening forms an acute angle with the level of the liquid that is larger than a given minimal operating angle, the flap closes and seals the first liquid opening at least by the hydrostatic force of the liquid and remains in a closed position at least by the positively magnetic attraction with the first liquid opening.

Preferably, the flap is pivotally mounted to the partition.

Typically, in an upright position of the vessel, the partition is horizontal.

Further typically, the given minimal operating angle is in the range of 20° to 70°.

If desired, in a tilted position of the vessel, the gravity force applied on the flap assists closing the flap against he first liquid opening.

Generally, in a tilted position of the vessel the hydrostatic force of the liquid assists maintaining the flap in a closed position.

Preferably, the lid assembly is detachably connected to the vessel.

Typically, the first liquid opening is provided with a ferro-magnetic part, the flap is provided with a magnet configured for operative association with the ferro-magnetic part and upon approach of the flap to the first liquid opening and closing of the first liquid opening, the magnetic attraction between the magnet and the ferromagnetic part maintains the flap in a closed position against the first liquid opening.

Preferably, the lid assembly is provided with a pouring button which when depressed, urges against the flap and opens the first liquid opening.

Typically, the pouring button is retained in a released position by means of a spring.

Furthermore, motion of the liquid and sloshing will impinge on the flap and assist closing the flap against the first liquid opening.

Generally, when poured from the vessel the liquid passes consistently through the first liquid opening, through the second upper portion and through the second liquid opening.

According to a specific embodiment of the present invention, the vessel comprises an operating rod, which upon manual actuation latchingly operates an electro-thermo-mechanical switch and simultaneously pushes a lever that moves the pouring button to a depressed position, thereby opening the first liquid opening.

If desired, the vessel is provided with a vapor opening that is aligned with a corresponding vapor opening in the lid assembly.

Further, if desired, the flap is provided with a pressure release valve.

According to still another embodiment of the present invention, the second upper portion of the lid assembly comprises a second partition that divides the second upper portion into a lower intermediate chamber and an upper exit chamber, the second partition comprising a valve and a third liquid opening, the valve being configured to close and seal the third liquid opening against passage of the liquid;

wherein, in a released position of the pouring button, the valve closes and seals the third liquid opening.

Typically, in a depressed position of the pouring button, the valve opens the third liquid opening and the pouring button pushes the flap thereby opening the first liquid opening.

Generally, the valve is coaxially mounted on the pouring button.

Moreover, a mechanical mechanism may replace the magnetic closure mechanism.

Preferably, the second upper portion of the lid assembly is detachably connected to the first partition.

If desired, the lid assembly comprises a manually operated lever for assisting depressing the depression of the pouring button.

Generally, the liquid is being poured from the vessel passes consistently through the first liquid opening, through the lower intermediate chamber, through the third liquid opening, through the upper exit chamber and through the second liquid opening.

Also, in general, liquid being filled into the vessel passes through the second liquid opening, then, through the second upper portion, and finally through the first liquid opening.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Figure 1:
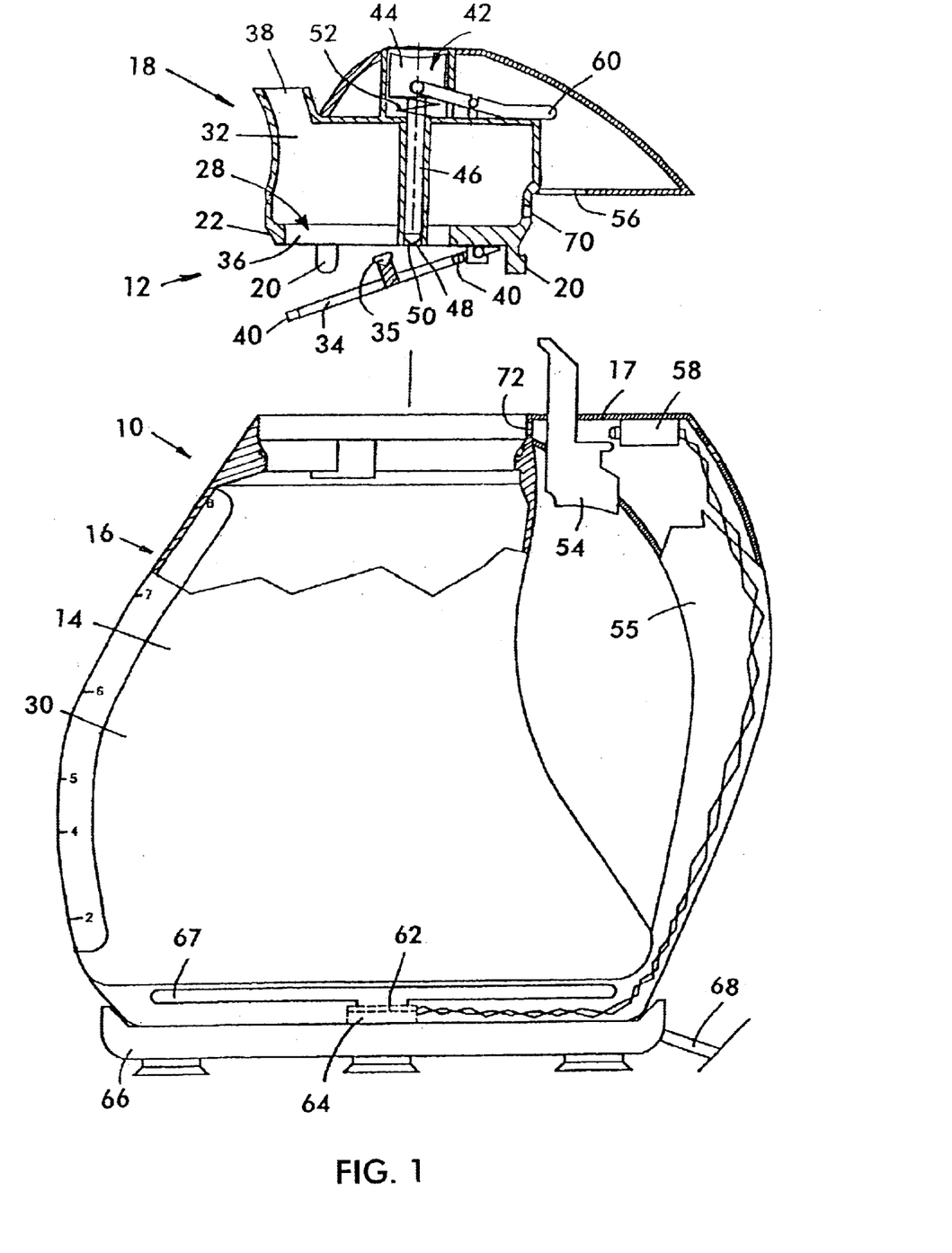
FIG. 1 is a partially sectioned exploded side view of a kettle with a safety device according to the present invention.
Figure 2:
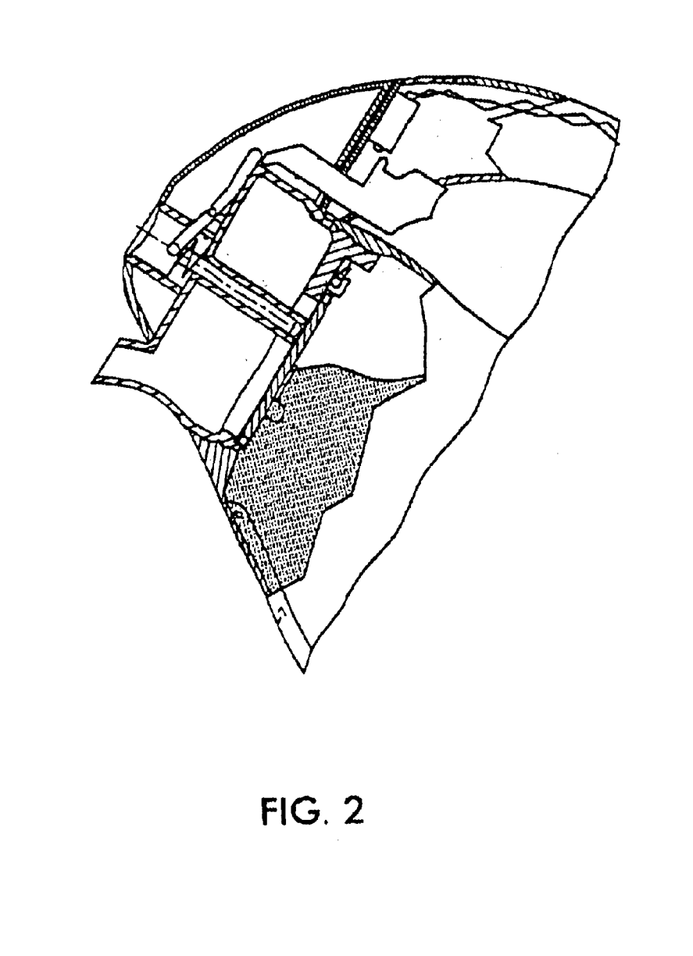
FIG. 2 is a partially sectioned side view of the upper part of the kettle of FIG. 1 in a tilted position with the flap closed.
Figure 3:
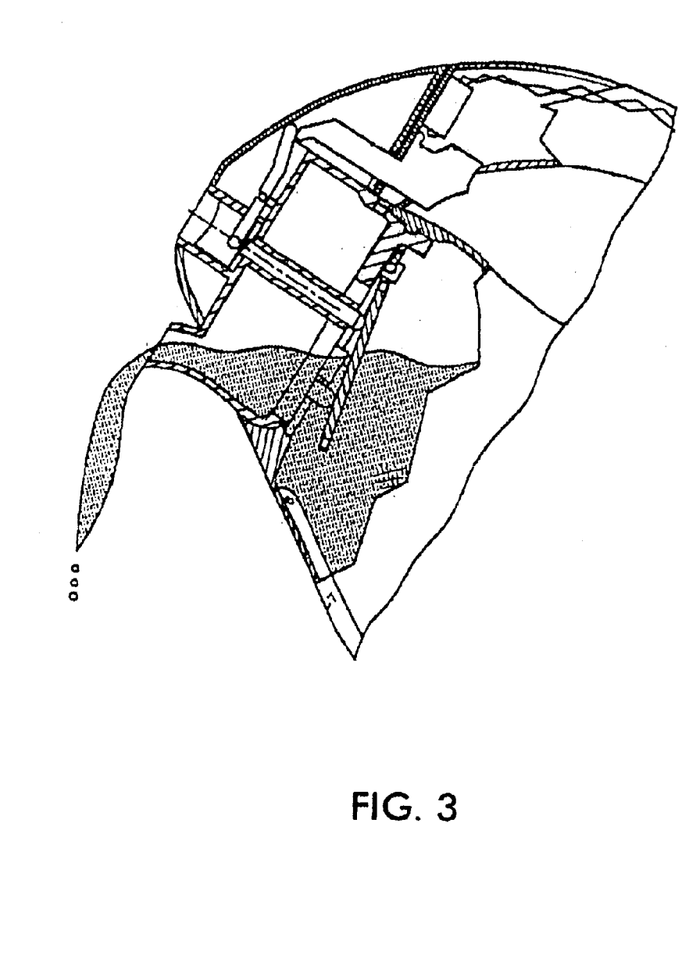
FIG. 3 is a partially sectioned side view of the upper part of the kettle of FIG. 1 in a tilted position with the flap open.

The present application is a continuation application of Israeli Patent Application No. 136543 filed Jun. 4, 2000. Reference is first made to FIGS. 1 to 3. As shown, a kettle 10 has a safety device, generally designated as 12, for preventing accidental spilling of a liquid 14 from the kettle 10. It is mentioned that the safety device 12 is not necessarily limited for use with a kettle only but could be equally well be adapted for use with any kind of vessel that contains a liquid. Furthermore, in the preferred embodiment of the invention, reference is made to water as the liquid in the kettle. However, it is understood that the invention is equally applicable to other liquids and to matter behaving like a fluid, and is not necessarily limited to the use of water.

The kettle 10 generally consists of a lower body portion 16, having an upper face 17, and an upper lid assembly 18. In the embodiment shown in FIG. 1, the lid assembly 18 is detachably connected to the body portion 16 in a bayonet type clamping by means of three protruding legs 20 that fit into corresponding slots accommodated in the body portion 16 of the kettle 10 for securing and tightening of the lid assembly 18 to the body portion 16. Evidently, other connection methods may also be implemented. For further tightening and sealing of the lid assembly 18 to the body portion 16, the lid assembly 18 is provided with a first conical surface 22, shaped in its lower peripheral portion, that mates with a corresponding second conical surface 24 in the body portion 16. A sealing ring 26, provided in the second conical surface 24, further ensures the sealed connection between the lid assembly 18 and the body portion 16. It should be noted, however, that it is not an essential feature of the present invention for the lid assembly 18 be detachable from the body portion 16.

The lid assembly 18 features a lower partition 28 that divides the kettle into a first lower liquid containing portion 30 and a second upper portion 32 empty from liquid, when the lid assembly 18 is tightened onto the body portion 16. According to a preferred embodiment of the present invention, when the kettle is standing in upright position, the partition 28 is horizontal. The partition 28 includes a movable flap 34, that is pivotally mounted to the partition, and a first liquid opening 36. The flap 34 is configured to seal the first liquid opening 36 against passage of the liquid 14. The flap 34 is provided with a pressure relief valve 35 for relieving pressure from the first lower liquid containing portion 30 in case the flap 34 is unintentionally closed after the kettle 10 is turned on for heating. Also, the pressure relief valve 35 ensures that the pressure will be relieved in case where, due to a malfunction of the operating system, the flap 34 is not in an open position during heating of the liquid. At an upper end of the second upper portion 32, the lid assembly 18 is provided with a spout 38 constituting a second liquid opening.

The lower partition 28 is provided with ferromagnetic parts (not specifically shown in the figures) adjacent the first liquid opening 36. The flap 34 is provided with one or more magnets 40 configured for operative association with the ferro-magnetic parts. The magnets 40 and the ferromagnetic parts, which may also be magnets, are be interchangeable between each other as long as they provide positive magnetic attraction between the flap 34 and the first liquid opening 36.

The lid assembly 18 is provided with a pouring button 42 that extends from the top to the bottom of the lid assembly 18. The pouring button 42 includes an upper part 44 adapted to be depressed by a finger of an operating person. The upper part 44 is connected to a downwardly directed pin 46 terminating in a lower end 48. The pin 46, retained within a guide 50, has two operating positions. In a first operating position, when the pouring button 42 is released, the lower end 48 of the pin 46 is substantially flush with the first liquid opening 36 and the flap 34 is not in contact with the pin 46. In a second operating position, when the pouring button 42 is depressed, the lower end 48 of the pin 46 protrudes downwardly with respect to the first liquid opening 36, thus pressing on the flap 34 to open the first liquid opening 36 if the latter was closed, or, if the first liquid opening 36 is already open, then, ensuring that the flap 34 will not close the first liquid opening 36. A spring 52, located beneath the upper part 44 of the pouring button 42, urges the pouring button upwardly forcing the button in the first operating position.

The kettle 10 is provided with an operating rod 54 retained in a holding handle 55 of the body portion 16. The operating rod 54 protrudes upwardly with respect to the upper face 17 of the body portion 16 and passes through a corresponding opening 56 in the lid assembly 18. When the operating rod 54 is manually depressed upwardly by a finger of an operating person, two functions are executed. First, an electro-thermo-mechanical switch 58 is latchingly operated. Second, a pivotally mounted lever 60, connected to the upper part 44 of the pouring button 42, is pushed. Thus, the upward movement of the operating rod 54 causes, through the lever 60, a downward movement of the pouring button 42 so that the pin 46 is urged into, its second operating position.

The electro-thermo-mechanical switch 58 is electrically wired to a male socket 62 located in the bottom of the body portion 16. The male socket 62 mates with a female socket 64 provided in a holding base 66 that receives therein the body portion 16. A concealed electric heater 67 is provided inside the bottom of the body portion 16 and is electrically connected to the male socket 62. A mains electrical supply 68 is coupled to the base 66.

The lid assembly 18 is provided with a first vapor opening 70 that is aligned with a second vapor opening 72 in the body portion 16, when the lid assembly is attached to the body portion. Vapor and steam are equivalent for the purposes of the present invention.

The operation of the kettle 10 will now be described. Prior to electrically operation, the kettle is checked to be filled with water up to a desired level defining a rest level of the water when the kettle is in upright position. Also, it should be checked that the lid assembly 18 is securely tightened to the body portion 16. It is mentioned that in the upright position of the kettle 10, the entire safety device 12 is located higher than and above the rest-level of the water.

For turning on the electricity to the electric heater 67, the operating rod 54 is manually depressed upwardly as described above. First, the operating rod 54 latchingly operates the electro-thermo-mechanical switch 58 thus operating the electric heater 67. Second, and simultaneously with the first operation, the operating rod 54 urges the lever 60 upwardly that in turn, pushes the pouring button 42 downwardly to the second operating position. Thus, by help of the pin 46 that protrudes downwardly with respect to the first liquid opening 36, it is ensured that the flap 34 remains normally open with respect to the first liquid opening 36.

In that position, the vapor produced during the heating of the water is free escape from the first lower liquid-containing portion 30, to pass through the first liquid opening 36 into the second upper portion 32, to partly escape to the atmosphere via the second liquid opening 38 and to partly pass through the first vapor opening 70 and through the second vapor opening 72 for heating the electro-thermo-mechanical switch 58. When the electro-thermo-mechanical switch 58 is sufficiently heated up to reach a predetermined temperature, it switches off the electrical supply to the electric heater 67, thus terminating the heating of the water in the kettle 10.

To pour the hot water out of the kettle 10, the kettle is lifted by the holding handle 55 out of its holding base 66. When tilting the kettle in the pouring direction, the first liquid opening 36 is also tilted and forms an acute angle with the water level. When the acute angle is larger than a given minimal operating angle, that is typically in the range of 20° to 70°, the hydrostatic force of the water closes the flap 34 that seals the first liquid opening 36. If the kettle 10 is tilted further, the gravity force applied on the flap 34 assists the closure of the flap against he first liquid opening 36. It is noted that motion of the liquid, like sloshing may also close the flap 34 against the first liquid opening.

When the flap 34 first closes and seals the first liquid opening 36, the flap remains closed at least by the positive magnetic attraction with the first liquid opening 36, even when the kettle is tilted back to an upright position. It is understood that in case the kettle remains in the tilted position, the hydrostatic force of the water also assists to keep the flap 34 in a closed position.

Therefore, in order to pour the hot water out of the kettle 10, the operating person must depress the pouring button 42 with another hand, thus ensuring that the flap 34 remains open to enable the water to pass through the first liquid opening 36, through the second upper portion 32 of the lid assembly 18 and trough the second liquid opening 38. When it is desired to pour water out of the kettle with one hand only, as may be required, for example, by a handicapped person, then, his is achieved by upwardly depressing the operating rod 54 with one finger of the same hand that holds the holding handle 55. By upwardly depressing the operating rod 54, it is assured, as explained above, that the downwardly protruding pin 46 will prevent the flap 34 from closing the first liquid opening 36.

If the kettle 10 is accidentally overturned or unwilingly tilted, then, as explained above, the flap 34 will close and seal the first liquid opening 36 and will remain closed until deliberately opened. Thus, it is ensured that no boiling water may accidentally escape out of the kettle, causing either severe burns to people or other damage.

Figure 4:
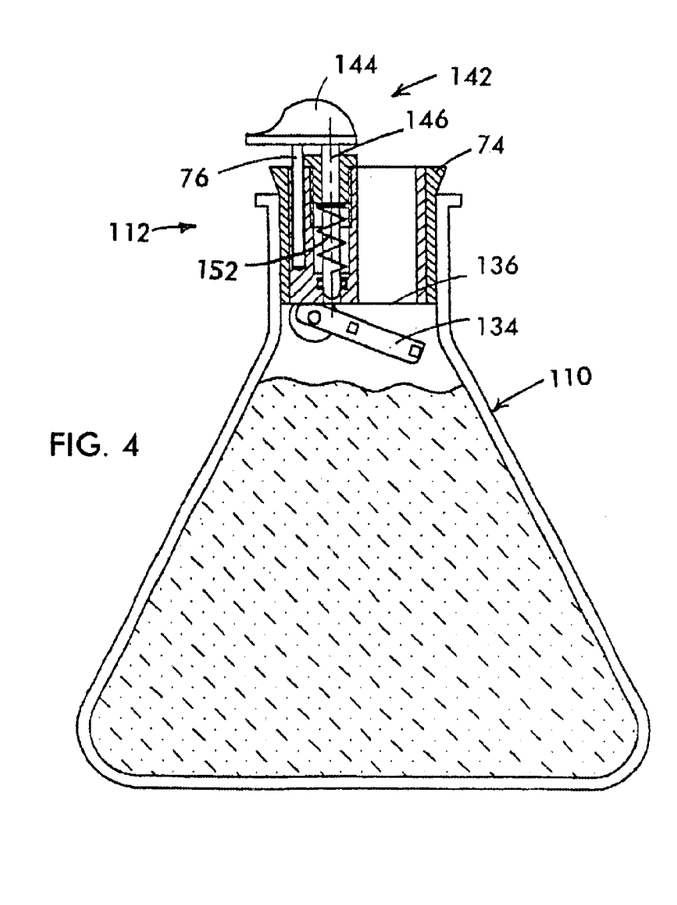
FIG. 4 is a cross-sectional side view of a laboratory vessel with a safety device according to the present invention.
Figure 5:
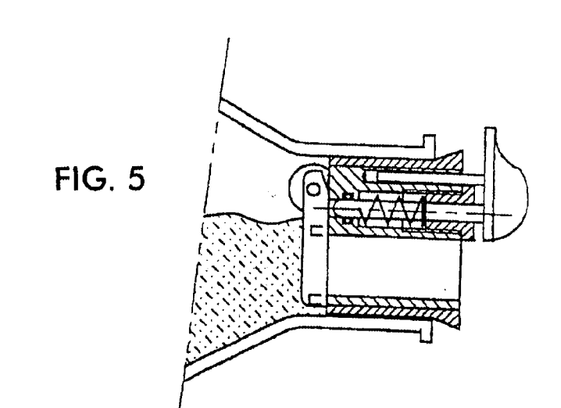
FIG. 5 shows the upper part of the vessel of FIG. 4 in a tilted position with the flap closed.
Figure 6:
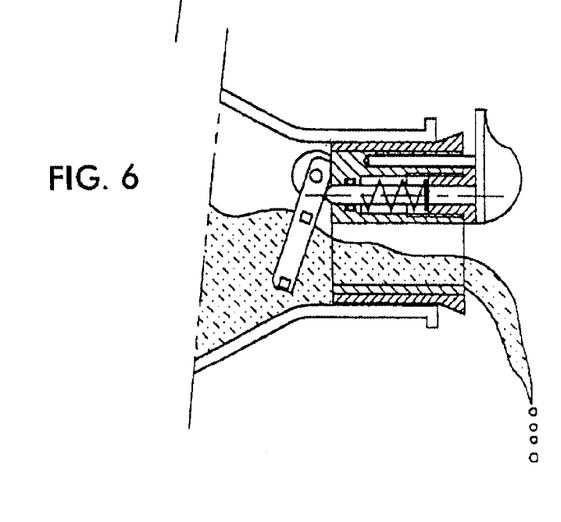
FIG. 6 shows the upper part of the vessel of FIG. 4 in a tilted position with the flap open.

Another example, according to the present invention, for use of a safety device for preventing accidental spilling of a liquid contained in a vessel is shown in FIGS. 4 to 6. With reference to the previously described embodiment, like parts will be denoted with like reference numerals with the addition of 100. As shown, a safety device 112 is used in a laboratory vessel 110. The entire safety device 112 is placed in the opening of the vessel 110 and is separated therefrom by a resilient sleeve 74. The safety device includes a flap 134 for closing and sealing a first liquid opening 136. A pouring button 142, having an upper part 144 and a pin 146, is urged upwardly by a spring 152. The pouring button 142 is prevented from rotation by means of a leading pin 76.

For normal pouring of the liquid out of the vessel 110, it is necessary to depress the pouring button 142 to ensure that the flap 134 remains open. If the vessel 110 is accidentally overturned or unwillingly tilted, then, as explained above, the flap 134 will close and seal the first liquid opening 136 that will remain closed until deliberately opened.

Figure 7:
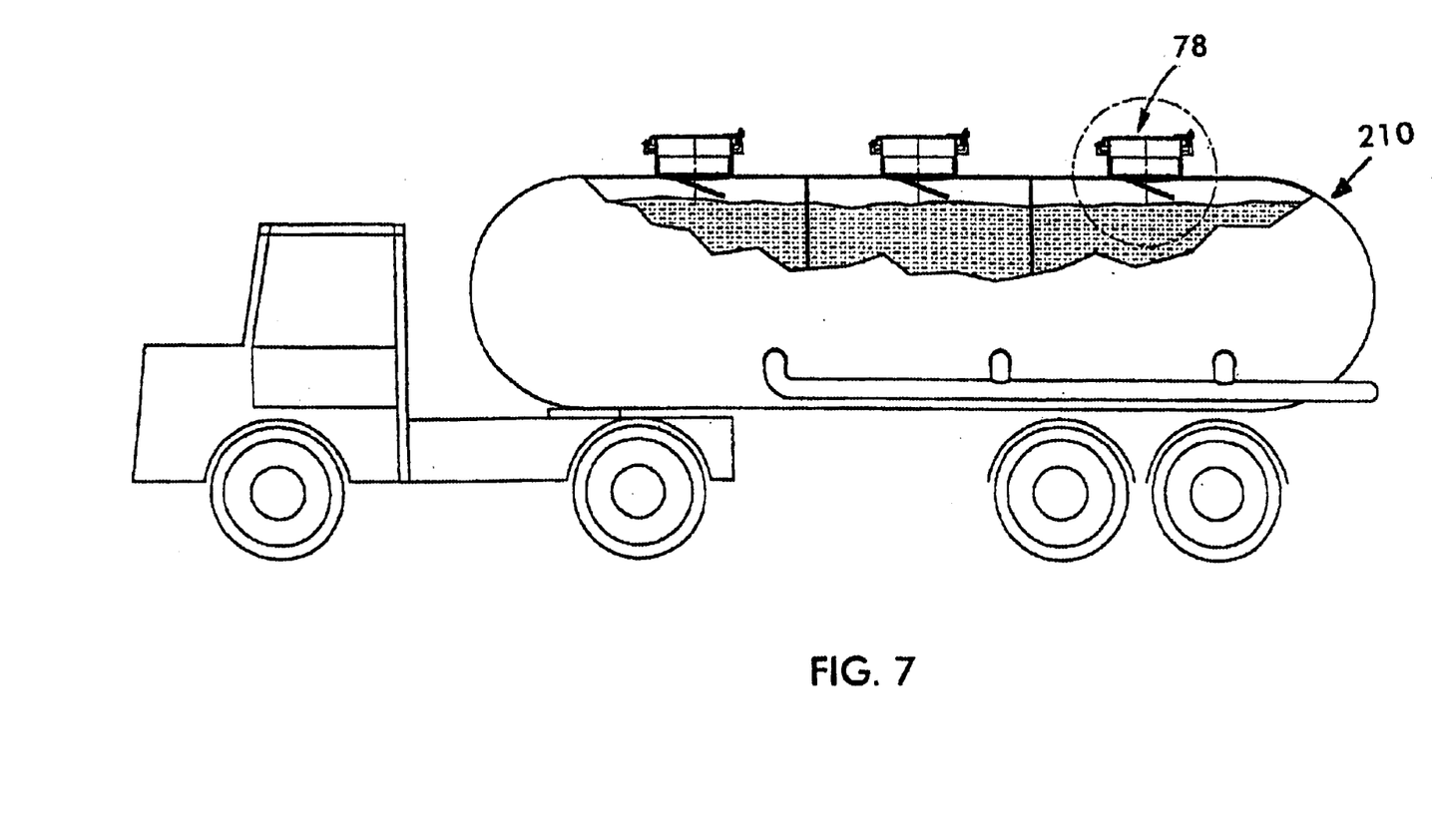
FIG. 7 is a partially sectioned side view of a tanker truck with a safety device according to the present invention.
Figure 8:
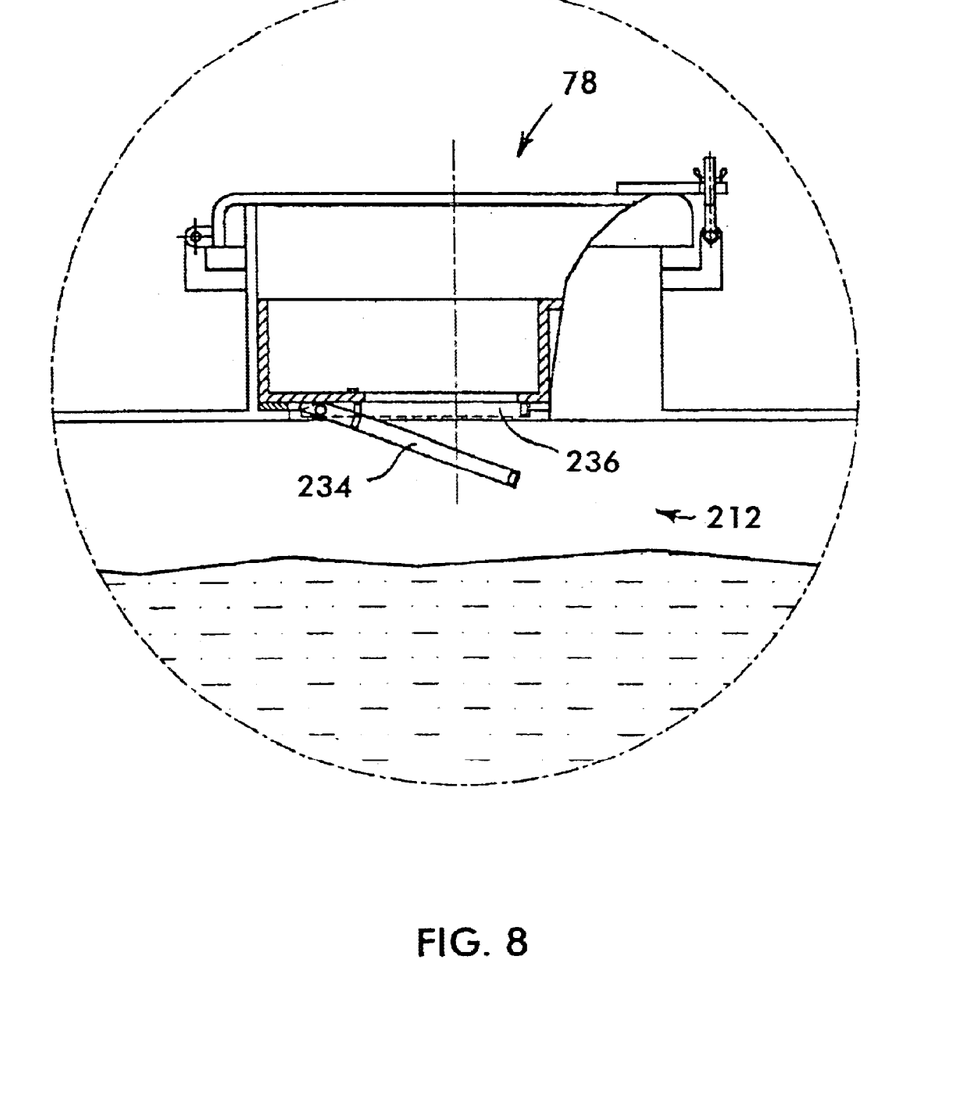
FIG. 8 is an enlarged view of a filling opening shown in FIG. 7.

Another example, according to the present invention, for use of a safety device for preventing accidental spilling of a liquid contained in a vessel is shown in FIGS. 7 and 8. With reference to the previously described embodiments, like parts will be denoted with like reference numerals with the addition of 200. As shown, a safety device 212 is used in a tanker truck 210. The entire safety device 212 is placed in a filling opening 78 of the tanker truck 210. The safety device 212 also has a flap 234 for closing and sealing a first liquid opening 236.

When filling the tanker truck 210, the liquid is poured through the filling opening 78 for the weight of the liquid to open the flap 234 in case that flap is closed. If the tanker truck 210 accidentally overturns, then, as explained above, the flap 234 will close and seal the first liquid opening 236.

Figure 9:
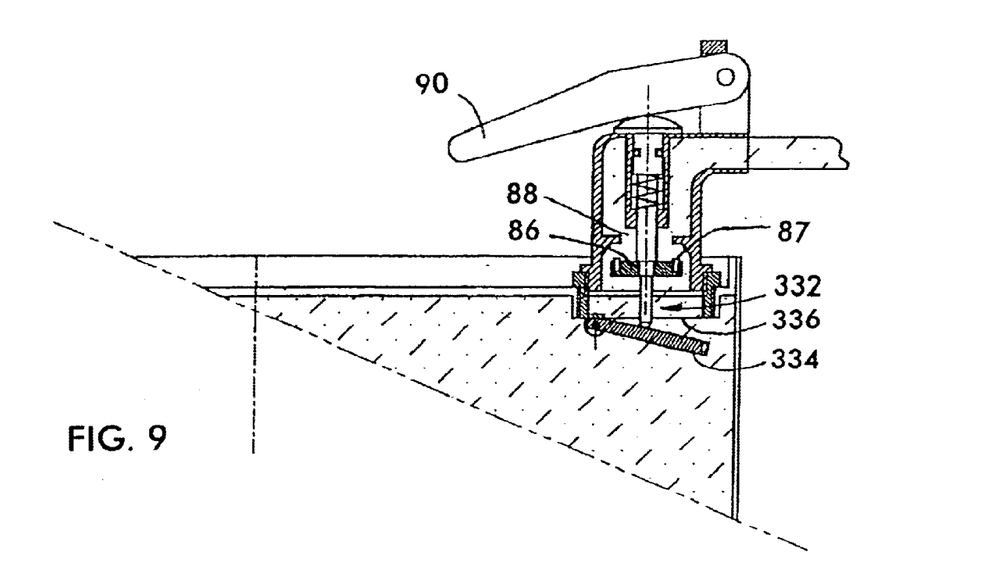
FIG. 9 is a sectional side view of a barrel with a safety device according to the present invention when the barrel is in a tilted position and the pouring button is released.
Figure 10:
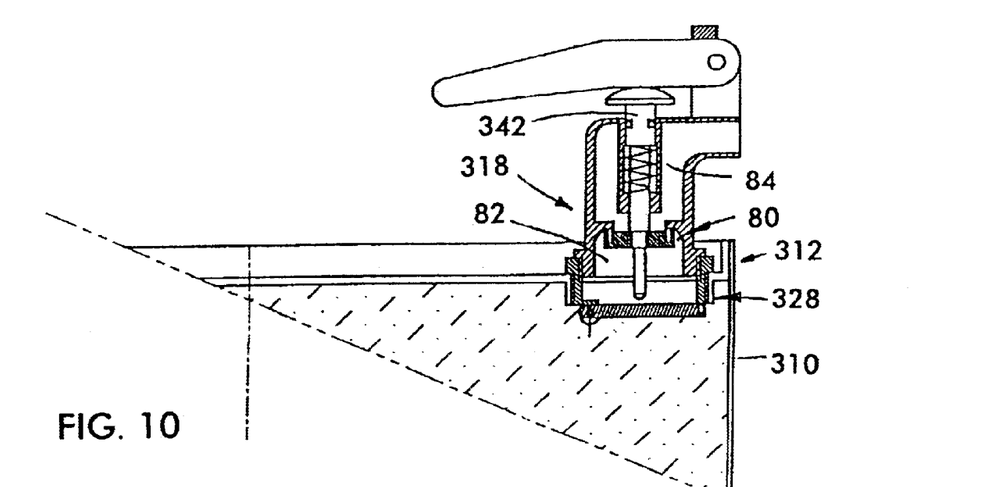
FIG. 10 shows the safety device of FIG. 9 with the pouring button being depressed.

Another example, according to the present invention, for use of a safety device for preventing accidental spilling of a liquid contained in a vessel is shown in FIGS. 9 and 10. With reference to the previously described embodiments, like parts will be denoted with like reference numerals with the addition of 300. As shown, a safety device 312 is used with a barrel 310. The safety device 312 holds a flap 334 for closing and sealing a first liquid opening 336. A second upper portion 332 of the lid assembly 318 includes a second upper partition 80 that divides the second upper portion 332 into a lower intermediate chamber 82 and an upper exit chamber 84. The second upper partition 80 comprises a valve 86, having a sealing ring 87, and a third liquid opening 88, the valve being configured to close and seal the third liquid opening 88 against the passage of liquid.

In a released position of the pouring button 342, the valve 86 closes and seals the third liquid opening 88. In a depressed position of the pouring button 342, the valve 86 opens the third liquid opening 88 and the pouring button 342 pushes the flap 334 thereby opening the first liquid opening 336.

The valve 86 is coaxially mounted on the pouring button 342. The second upper portion 332 of the lid assembly 318 is detachably connected to the lower partition 328. The lid assembly 318 includes a manually operated lever 90 for assisting to depress the pouring button 342.

To assemble the safety device 312 onto the barrel 310, the barrel should be standing upright, as shown in FIGS. 9 and 10. In that upright position, the first liquid opening 336 is open and the third liquid opening 88 is closed. At this stage, if the barrel 310 is accidentally overturned, the flap 334 closes the first liquid opening 336. Thus, an additional sealing of the barrel 310 is obtained thereby increasing safety.

To use the lid assembly 318 for pouring liquid out of the barrel 310, it is required to tilt the barrel 90°, in a clockwise direction, relative to the view shown in FIGS. 9 and 10.

Figure 11:
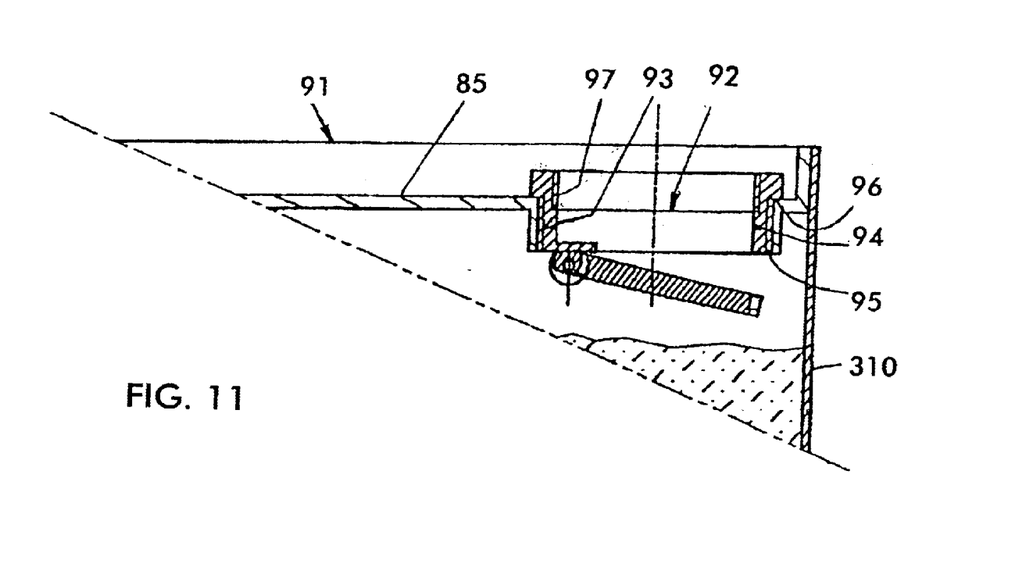
FIG. 11 is a sectional side view of a barrel with a safety device according to the present invention.
Figure 12:
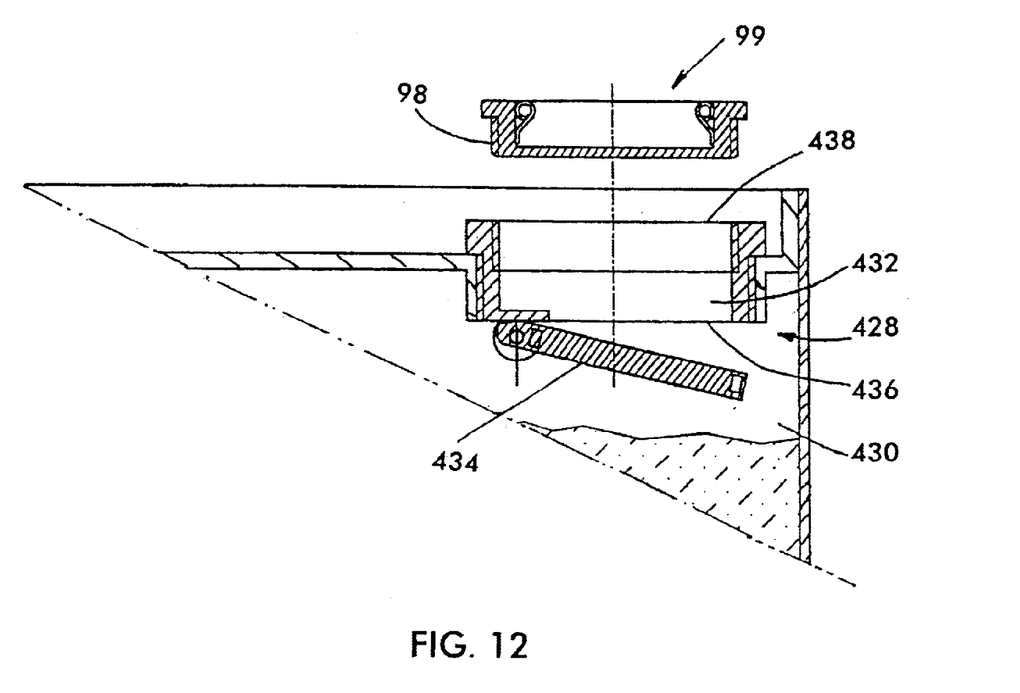
FIG. 12 is an exploded sectional side view of the safety device of FIG. 11 with a plug for the barrel.
Figure 13:
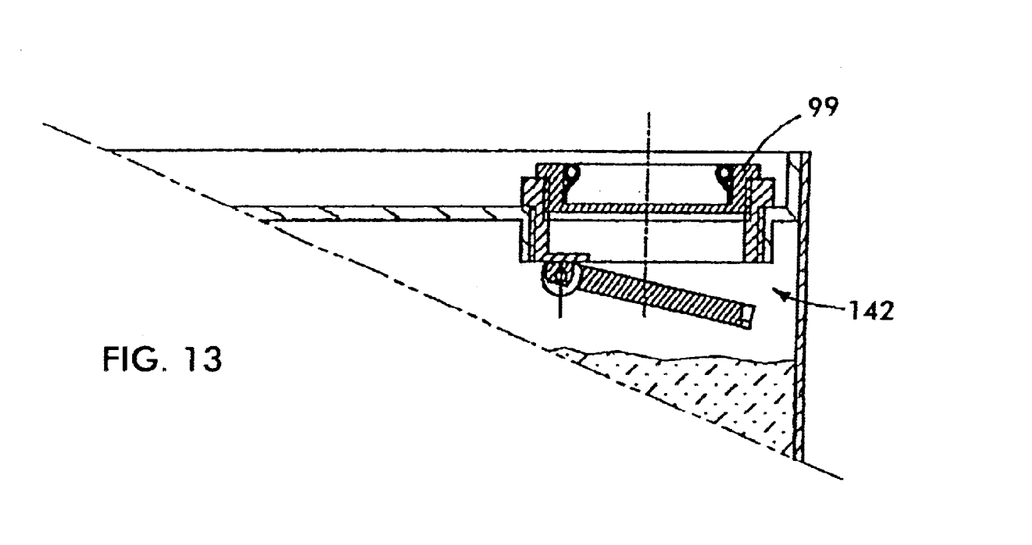
FIG. 13 is a sectional side view of the safety device and the plug of FIG. 12 in an assembled position.

According to the present invention, another example employing a modified use of the safety device with a barrel 310 is shown in FIGS. 11 to 13. With reference to the previously described embodiments, like parts will be denoted with like reference numerals with the addition of 400. The barrel 310 contains a liquid and is of a common type, well known in the market. The barrel 310 comprises a lid 91. The lid 91 is, typically, integrally formed with the barrel 310, however, the lid 91 can be detachable from the barrel 310. The lid 91 has an upper surface 85 and an opening 92. The opening 92 has a vertically extending internal thread 93 for threadingly receiving therein a common plug (not shown) that seals the opening 92 against passage of the liquid out of the barrel 310.

For the sake of safety, a safety device 412 is detachably connected to the barrel 310. The safety device 412 comprises a sleeve 94. In the external portion of the sleeve 94, the sleeve has an external thread 95 and a downwardly facing stopper 96 adjacent the upper end of the external thread 95. When mounting the safety device 412 onto the barrel 310, the sleeve 94 is first aligned with the opening 92. Then, the external thread 95 of the sleeve 94 is threadingly engaged with the internal thread 93 of the opening 92 until the stopper 96 abuts the upper surface 85 of the lid 91.

The inner portion of the sleeve 94 has an internal thread 97 for threadingly receiving an external thread 98 of a plug 99. The plug 99 is configured to close and seal a second liquid opening 438. The safety device 412 comprises a lower partition 428 that divides the barrel 310 into a first lower liquid containing portion 430 and a second upper portion 432 empty from liquid. The upper end of the second upper portion 432 constitutes the second liquid opening 438.

The lower partition 428 comprises a movable flap 434 and a first liquid opening 436. The flap 434 has positive magnetic attraction with the first liquid opening 436 and is configured to close and seal the first liquid opening 436 against passage of the liquid. If the barrel 310 is accidentally overturned, the flap 434 closes and seals the first liquid opening 436, thereby preventing spilling of the liquid even if the plug 99 is not closing the second liquid opening 438.

In all the embodiments described above, the flap closes as a result of the tilting of a vessel that contains a liquid. However, the closing of the flap may occur also as a result of sloshing of the liquid in the vessel. Even though the invention has been described with respect to a liquid contained in a vessel, the invention is equally applicable with respect to any material that may flow when tilted from a rest level. It is mentioned that generally, with respect to the above described embodiments, in order to fill the vessel with liquid, the liquid has to pass through the second liquid opening, then, through the second upper portion, and, finally, through the first liquid opening.

Although the present invention has been described to a certain degree of particularity, it should be understood various alterations and modifications could be made without departing from the spirit or scope of the invention as hereinafter claimed.

What is claimed is:

1. A safety device for a liquid-containing vessel for preventing accidental spilling of a liquid contained in the vessel, the liquid having a rest level;
   the safety device comprising a lid assembly having a lower partition, the partition dividing the vessel into a first low liquid containing portion and a second upper portion empty from the liquid and having a second liquid opening, the lower partition comprising a movable flap and a first liquid opening that is located lower than and below the second liquid opening in an upright position of the vessel, the flap having positive magnetic attraction with the first liquid opening and being configured to seal the first liquid opening against passage of the liquid;
   in an upright position of the vessel, the entire safety device is located higher than and above the rest level of the liquid and the flap is normally open with respect to the first liquid opening;
   in a tilted position of the vessel, where the level of the liquid forms an acute angle with the first liquid opening that is larger than a given minimal operating angle, the flap closes and seals the first liquid opening at least under the hydrostatic force of the liquid and remains in a closed position at least by the positive magnetic attraction with the first liquid opening.

2. The safety device according to claim 1, wherein the flap is pivotally mounted to the partition.

3. The safety device according to claim 1, wherein in an upright position of the vessel, the partition is horizontal.

4. The safety device according to claim 1, wherein the given minimal operating angle is in the range of 20° to 70°.

5. The safety device according to claim 1, wherein in a tilted position of the vessel, the gravity force applied on the flap assists closing the flap against the first liquid opening.

6. The safety device according to claim 1, wherein in a tilted position of the vessel, the hydrostatic force of the liquid assists maintaining the flap in a closed position.

7. The safety device according to claim 1, wherein the lid assembly is detachably connected to the vessel.

8. The safety device according to claim 1, wherein the first liquid opening is provided with a ferro-magnetic part, the flap is provided with a magnet configured for operative association with the ferro-magnetic part and upon approach of the flap to the first liquid opening and closing of the first liquid opening, the magnetic attraction between the magnet and the ferro-magnetic part maintains the flap in a closed position against the first liquid opening.

9. The safety device according to claim 1, wherein the lid assembly is provided with a pouring button which when depressed, urges against the flap and opens the first liquid opening.

10. The safety device according to claim 9, wherein the pouring button is retained in a released position by means of a spring.

11. The safety device according to claim 1, wherein the liquid, when poured from the vessel, passes consistently through the first liquid opening, through the second upper portion and through the second liquid opening.

12. The safety device according to claim 1, wherein the vessel comprises an operating rod, which upon manual actuation latchingly operates an electro-thermo-mechanical switch and simultaneously pushes a lever that moves the pouring button to a depressed position, thereby opening the first liquid opening.

13. The safety device according to claim 1, wherein the vessel is provided with a vapor opening that is aligned with a corresponding vapor opening in the lid assembly.

14. The safety device according to claim 1, wherein the flap is provided with a pressure release valve.

15. The safety device according to claim 1, wherein the second upper portion of the lid assembly comprises a second partition that divides the second upper portion into a lower intermediate chamber and an upper exit chamber,
   the second partition comprising a valve and a third liquid opening, the valve being configured to close and seal the third liquid opening against passage of the liquid;
   wherein, in a released position of the pouring button, the valve closes and seals the third liquid opening.

16. The safety device according to claim 15, wherein in a depressed position of the pouring button, the valve opens the third liquid opening and the pouring button pushes the flap thereby opening the first liquid opening.

17. The safety device according to claim 15, wherein the valve is coaxially mounted on the pouring button.

18. The safety device according to claim 15, wherein the second upper portion of the lid assembly is detachably connected to the first partition.

19. The safety device according to claim 15, wherein the lid assembly comprises a manually operated lever for assisting the depression of the pouring button.

20. The safety device according to claim 15, wherein the liquid being poured from the vessel, passes consistently through the first liquid opening, through the lower intermediate chamber, through the third liquid opening, through the upper exit chamber and through the second liquid opening.

21. The safety device according to claim 1, wherein the liquid is filled into the vessel by passing through the second liquid opening, then, through the second upper portion, and finally, through the first liquid opening.

22. A safety device for a liquid-containing vessel for preventing accidental spilling of a liquid contained in the vessel, the liquid having a rest level;
   the safety device comprising a lid assembly having a lower partition, the partition dividing the vessel into a first lower liquid containing portion and a second upper portion empty from the liquid and having a second liquid opening, the lower partition comprising a movable flap and a first liquid opening that is located lower than and below the second liquid opening in an upright position of the vessel, the flap being coupled by a mechanical mechanism to the first liquid opening and being configured to seal the first liquid opening against passage of the liquid;
   in an upright position of the vessel, the entire safety device is located higher than and above the rest level of the liquid and the flap is normally open with respect to the first liquid opening;
   in a tilted position of the vessel, where the level of the liquid forms an acute angle with the first liquid opening that is larger than a given minimal operating angle, the flap closes and seals the first liquid opening at least under the hydrostatic force of the liquid and remains in a closed position at least by the operation of the mechanical mechanism relative to the first liquid opening.

* * * * *